US009820157B1

(12) United States Patent
Rajendran et al.

(10) Patent No.: US 9,820,157 B1
(45) Date of Patent: Nov. 14, 2017

(54) METHOD AND SYSTEM FOR LOCALIZING SPATIALLY SEPARATED WIRELESS TRANSMITTERS

(71) Applicant: Wipro Limited, Bangalore (IN)

(72) Inventors: Surendran Rajendran, Chennai (IN); Ramachandra Budihal, Bangalore (IN); Venkata Prabhakar Tamma, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/464,035

(22) Filed: Mar. 20, 2017

(30) Foreign Application Priority Data

Mar. 6, 2017 (IN) .............................. 201741007847

(51) Int. Cl.
| | | |
|---|---|---|
| *H04W 40/00* | (2009.01) | |
| *H04W 16/12* | (2009.01) | |
| *H04B 17/318* | (2015.01) | |
| *H04W 48/16* | (2009.01) | |
| *H04B 17/18* | (2015.01) | |

(52) U.S. Cl.
CPC ............ *H04W 16/12* (2013.01); *H04B 17/18* (2015.01); *H04B 17/318* (2015.01); *H04W 48/16* (2013.01)

(58) Field of Classification Search
CPC .......................... H04W 4/028; H04W 52/0258
USPC ........ 455/433, 418, 436, 435.1, 45.1, 422.1, 455/453, 438, 447
See application file for complete search history.

(56) References Cited

U.S. PATENT DOCUMENTS

| | | | |
|---|---|---|---|
| 8,532,672 B2 | 9/2013 | Kruglick | |
| 8,565,787 B2 | 10/2013 | Bevan et al. | |
| 8,874,477 B2* | 10/2014 | Hoffberg | G06Q 10/0631 705/37 |
| 2003/0106492 A1* | 6/2003 | Levinson | B01J 19/0046 117/200 |
| 2006/0153469 A1* | 7/2006 | Gallagher | G06F 17/30265 382/254 |
| 2006/0246495 A1* | 11/2006 | Garrett | C12Q 1/6883 435/6.18 |
| 2007/0021929 A1* | 1/2007 | Lemmo | G01N 35/00613 702/22 |

(Continued)

OTHER PUBLICATIONS

Mankar et al., "Likelihood Criteria Based Co-Channel Primary Transmitters Localization Algorithm for Cognitive Radio Networks," IEEE Tencon—Spring, pp. 411-415 (2013).

*Primary Examiner* — Joseph Arevalo
(74) *Attorney, Agent, or Firm* — LeClairRyan, a Professional Corporation

(57) ABSTRACT

A technique is provided for localizing a plurality of wireless transmitters. The technique includes retrieving Received Signal Strength Indicator (RSSI) values measured by one or more sensors, corresponding to the plurality of wireless transmitters distributed in a region in which the sensors are located. The technique further comprises generating, a plurality of clusters based on the retrieved RSSI values. The technique further comprises generating a binary image based on the generated clusters. The binary image comprises one or more white regions and one or more black regions. The technique further comprises localizing position of each of the plurality of wireless transmitters, based on a determination of contours of the one or more white regions present in the binary image.

15 Claims, 6 Drawing Sheets

(56) References Cited

U.S. PATENT DOCUMENTS

| | | | |
|---|---|---|---|
| 2011/0143811 A1* | 6/2011 | Rodriguez | G06K 9/00986 |
| | | | 455/556.1 |
| 2011/0212717 A1* | 9/2011 | Rhoads | G06F 17/30241 |
| | | | 455/420 |
| 2012/0182933 A1* | 7/2012 | Bandhakavi | G01S 5/0242 |
| | | | 370/328 |
| 2012/0184292 A1* | 7/2012 | Lin | H04W 64/003 |
| | | | 455/456.1 |
| 2014/0080428 A1* | 3/2014 | Rhoads | G06F 17/30241 |
| | | | 455/88 |
| 2016/0196587 A1* | 7/2016 | Eder | G06Q 30/00 |
| | | | 705/14.49 |
| 2016/0379074 A1* | 12/2016 | Nielsen | G06K 9/3241 |
| | | | 348/143 |
| 2017/0070822 A1* | 3/2017 | Skovenborg | H04R 3/12 |
| 2017/0215028 A1* | 7/2017 | Rhoads | H04W 4/005 |

* cited by examiner

METHOD AND SYSTEM FOR LOCALIZING SPATIALLY SEPARATED WIRELESS TRANSMITTERS

This application claims the benefit of Indian Patent Application Serial No. 201741007847, filed Mar. 6, 2017, which is hereby incorporated by reference in its entirety.

TECHNICAL FIELD

This disclosure relates generally to localizing wireless transmitters, and more particularly to system and method for localizing spatially separated wireless transmitters.

BACKGROUND

In large indoor spaces, such as aircrafts, factory floors, or warehouses, multiple wireless transmitters are distributed widely. All the wireless transmitters have an individual transmission power and frequency of operation. However, due to limited availability of frequency spectrum it becomes imperative to reuse the frequencies used for transmissions by the wireless transmitters. Such a reuse enables full utilization of the available frequency spectrum for communication. In order to enable the reuse of the frequency spectrum, an estimation of the positions of the wireless transmitters across the indoor space needs to be made. This is because placing the wireless transmitters using the same in the proximity of each other may lead to interference and subsequent loss of information transmitted by the wireless transmitters.

It is therefore desirable to provide a mechanism to localize the positions of the wireless transmitters with accuracy. It may further be desirable to feed such information to network planning systems so that the process of frequency reuse may be automated.

SUMMARY

In one embodiment, a method of localizing a plurality of wireless transmitters is disclosed. In one example, the method comprises retrieving, by a localization device, Received Signal Strength Indicator (RSSI) values measured by one or more sensors, corresponding to the plurality of wireless transmitters distributed in a region in which the sensors are located. The method further comprises generating, by the localization device, a plurality of clusters based on the retrieved RSSI values. The method further comprises generating, by the localization device, a binary image based on the generated clusters. The binary image comprises one or more white regions and one or more black regions. The method further comprises localizing, by the localization device, position of each of the plurality of wireless transmitters, based on a determination of contours of the one or more white regions present in the binary image.

In another embodiment, a system for localizing a plurality of wireless transmitters is disclosed. The system comprises a processor and a memory communicatively coupled to the processor. The memory stores processor-executable instructions, which, on execution, cause the processor to retrieve Received Signal Strength Indicator (RSSI) values measured by one or more sensors, corresponding to the plurality of wireless transmitters distributed in a region in which the sensors are located. The processor-executable instructions, on execution, further cause the processor to generate a plurality of clusters based on the retrieved RSSI values. The processor-executable instructions, on execution, further cause the processor to generate a binary image based on the generated clusters. The binary image comprises one or more white regions and one or more black regions. The processor-executable instructions, on execution, further cause the processor to localize position of each of the plurality of wireless transmitters, based on a determination of contours of the one or more white regions present in the binary image.

In another embodiment, a non-transitory computer-readable medium storing computer-executable instructions for localizing a plurality of wireless transmitters is disclosed. In one example, the stored instructions, when executed by a processor, cause the processor to perform operations that comprise retrieving Received Signal Strength Indicator (RSSI) values measured by one or more sensors, corresponding to the plurality of wireless transmitters distributed in a region in which the sensors are located. The operations further comprise generating a plurality of clusters based on the retrieved RSSI values. The operations further comprise generating a binary image based on the generated clusters. The binary image comprises one or more white regions and one or more black regions. The operations further comprise localizing position of each of the plurality of wireless transmitters, based on a determination of contours of the one or more white regions present in the binary image.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
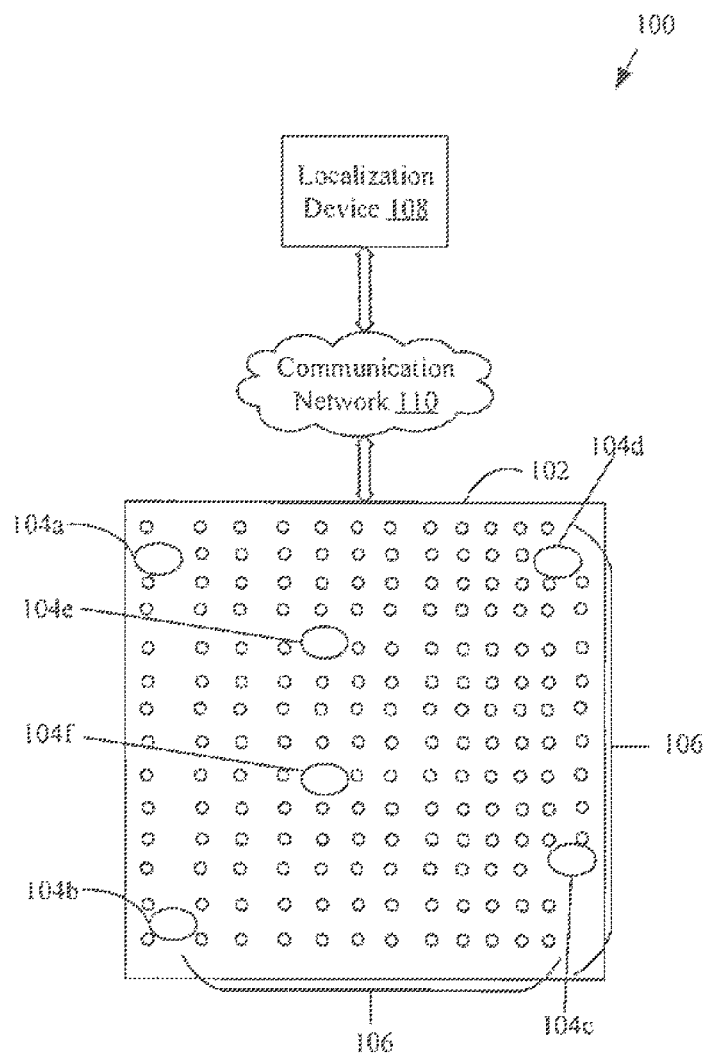
FIG. 1 is a block diagram of an exemplary network environment for localizing a plurality of wireless transmitters, in accordance with some embodiments of the present disclosure.

Referring now to FIG. 1, an exemplary network environment 100 for localizing a plurality of wireless transmitters is illustrated, in accordance with some embodiments of the present disclosure. As will be described in greater detail in conjunction with FIG. 2, the network environment 100 displays a region, such as an indoor space 102, which includes a plurality of wireless transmitter 104a to 104f. The indoor space 102 further includes a one or more sensors in the form of one or more sensors 106 that may be distributed uniformly in a grid pattern. In an implementation, the indoor space may correspond to a Cartesian coordinate space wherein each of the plurality of wireless transmitter 104a to 104f, and each sensor of the one or more sensors 106, may be assigned a Cartesian coordinate. A person of ordinary skill in the art will appreciate that the distribution of the one or more sensors 106 may be uniform in the aforementioned indoor space 102. However, in alternate embodiments, the distribution of the one or more sensors 106 in the indoor space 102 may be non-uniform.

The network environment 100 may further include a localization device 108 that may be communicatively coupled with each sensor of the one or more sensors 106, via the communication network 110. In an implementation, the localization device 108 may be placed within the confines of the indoor space 102. In an alternate implementation, the localization device 108 may be placed at a location that is remote with respect to the indoor space 102.

In an implementation, the network environment 100 may further include a network of computing devices (e.g., a computer, a server, a digital device, a router, a modem, a bridge, a switch, etc.) for sending or receiving various data. Each of the computing devices may further include one or more processors and a computer-readable medium (e.g., a memory). The computer-readable storage medium stores instructions that, when executed by the one or more processors, cause the one or more processors to perform localization of the plurality of wireless transmitters 104a to 104f, in accordance with aspects of the present disclosure. The computer-readable storage medium may also store various data (e.g., optimal network path, optimal packet size, data packets, current packet size of a node, etc.) that may be captured, processed, and/or required by the network environment 100.

In operation, a sensor from the one or more sensors 106 may measure the Received Signal Strength (RSSI) values corresponding one or more transmitters from the plurality of wireless transmitters 104a to 104f. The one or more sensors 106 may communicate the measured RSSI values to a database (not shown), via the communication network 110. The aforementioned database may be configured to store the reported RSSI values corresponding to the each of the one or more sensors 106, along with the location (Cartesian coordinates) of each of the one or more sensors 106.

In an embodiment, the communication network 110 may include a medium through which the one or more sensors 106 and the localization device 108 present in the network environment 100 may communicate with each other. Examples of the communication network 110 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

In an embodiment, the localization device 108 may retrieve Received Signal Strength Indicator (RSSI) values measured by the one or more sensors 106, corresponding to the plurality of wireless transmitters 104a to 104f, distributed in the indoor space 102. In an embodiment, the RSSI values may be retrieved from the database where the RSSI values measured by the one or more sensors 106 are stored. In an embodiment, such a database may be placed remotely with respect to the localization device 108. In another embodiment, such a database may be integrated with the localization device 108. In an embodiment, the aforementioned database may be implemented by use of various database technologies known in the art. Examples of the multimedia database 106 may include, but are not limited to, Microsoft® SQL Server, Oracle®, IBM DB2®, Microsoft Access®, PostgreSQL®, MySQL®, and/or SQLite®. In an embodiment, the localization device 108 may be communicatively coupled with the multimedia database 106, based on one or more protocols. Examples of such one or more protocols may include, but are not limited to, Open Database Connectivity (ODBC)® protocol and Java Database Connectivity (JDBC)® protocol.

The localization device 108 may further generate a plurality of clusters based on the retrieved RSSI values. In an embodiment, the generation of the plurality of clusters includes creation of a data structure having RSSI values measured by each of the one or more sensors 106. Each element of the data structure corresponds to a location (Cartesian coordinates) of a sensor from the one or more sensors 106. The generation of the plurality of clusters may further include determination of a plurality of centroids of the data structure having the RSSI values. In an embodiment, the plurality of centroids may be determined based on a random selection of the RSSI values from the data structure. The determination of the plurality of clusters may be based on K-means clustering algorithm. Notwithstanding, the disclosure may not be so limited, and the generation of the plurality of clusters may be based on one or more other clustering algorithms known in the art, without limiting the scope of the disclosure.

In an embodiment, the count of the generated clusters may be based on a maximum range of transmission of the plurality of wireless transmitters 104a to 104f and a recommended minimum distance between the one or more sensors located in the indoor space 102. A person of ordinary skill in the art will appreciate that a difference in the maximum range of transmission of the plurality of wireless transmitters 104a to 104f is less than a predefined threshold. In other words, the maximum range of transmission of the plurality of wireless transmitters is comparable.

The localization device 108 may generate a binary image based on the generated clusters. The binary image may include white regions and/or black region. The white region may be in the binary image may be indicative of a region in which a transmitter of the plurality of transmitter may present. Mathematically, the white regions may correspond to a one or more elements of the aforementioned data structure where the values present are "1". Conversely, the black region in the binary image may be indicative of a region in which a transmitter of the plurality of transmitter are not present. Mathematically, the black regions may correspond to a one or more elements of the aforementioned data structure where the values present are "0".

The localization device 108 may determine the contours of the generated white regions. In an embodiment, the determination of the contours may be based on Moore-Neighbor Tracing algorithm. In an alternate embodiment, the determination of the contours of the generated white regions may be based on one or more other image processing algorithms, without limiting the scope of the disclosure.

The localization device 108 may further localize the position of each of the plurality of wireless transmitters 104a to 104f, based on a determined contours of the one or more white regions present in the binary image. The localization device 108 may further store the determined positions of the plurality of wireless transmitters 104a to 104f in the database for future reference.

It should be noted that the various modules described above may be implemented in programmable hardware devices such as programmable gate arrays, programmable array logic, programmable logic devices, and so forth. Alternatively, the various modules described above may be implemented in software for execution by various types of processors. An identified module of executable code may, for instance, include one or more physical or logical blocks of computer instructions which may, for instance, be organized as an object, procedure, function, engine, or other construct. Nevertheless, the executables of an identified module need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for transmitting data over a communication network. For example, the exemplary network environment 100 may transmit data over a communication network 110 by the processes discussed herein. In particular, as will be appreciated by those of ordinary skill in the art, control logic and/or automated routines for performing the techniques and steps described herein may be implemented by the network environment 100, either by hardware, software, or combinations of hardware and software. For example, suitable code may be accessed and executed by the one or more processors on the network environment 100 to perform some or all of the techniques described herein. Similarly, application specific integrated circuits (ASICs) configured to perform some or all of the processes described herein may be included in the one or more processors on the network environment 100.

Figure 2:
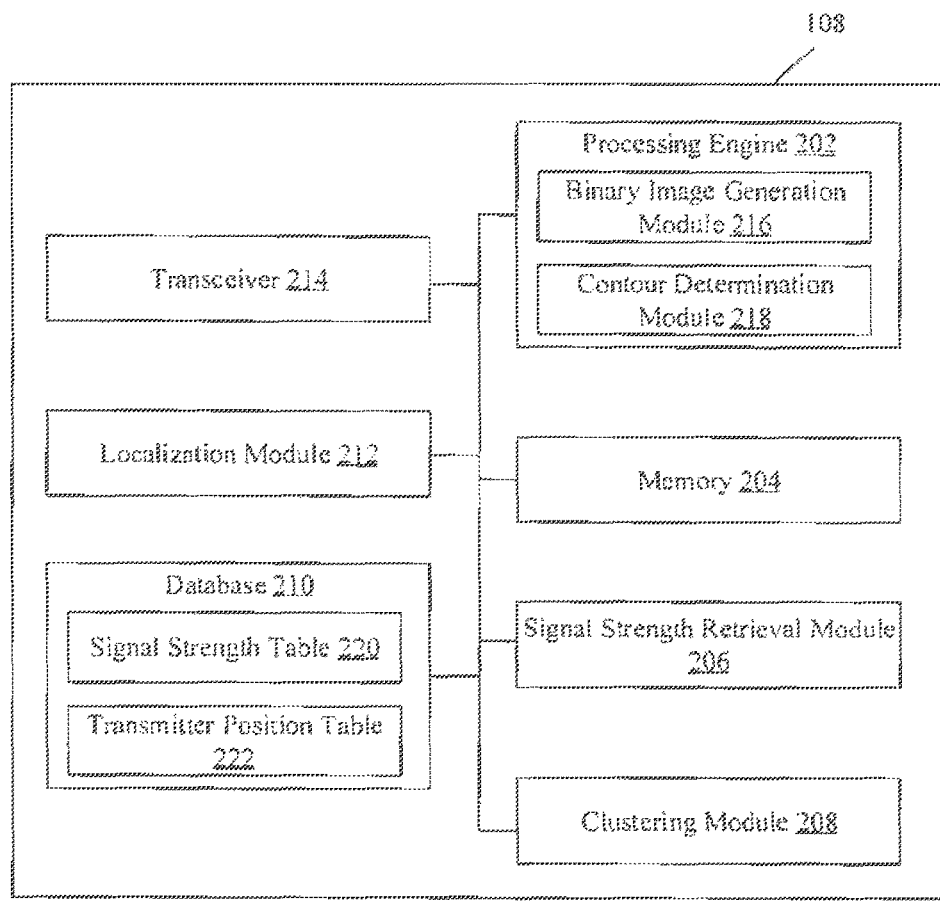
FIG. 2 is a block diagram of exemplary system for localizing a plurality of wireless transmitters, in accordance with some embodiments of the present disclosure.
Figure 3A:
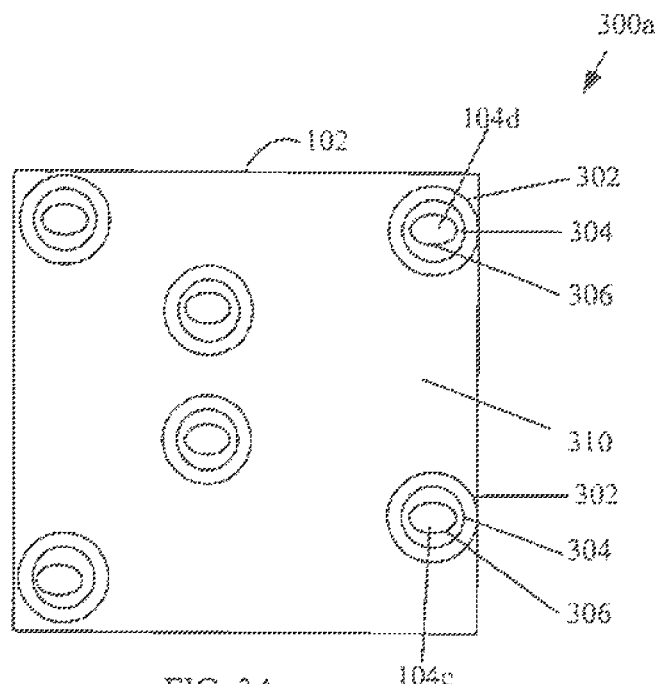
FIGS. 3A-3D illustrate an exemplary versions of a processed indoor space localizing a plurality of wireless transmitters, in accordance with some embodiments of the present disclosure.
Figure 3B:
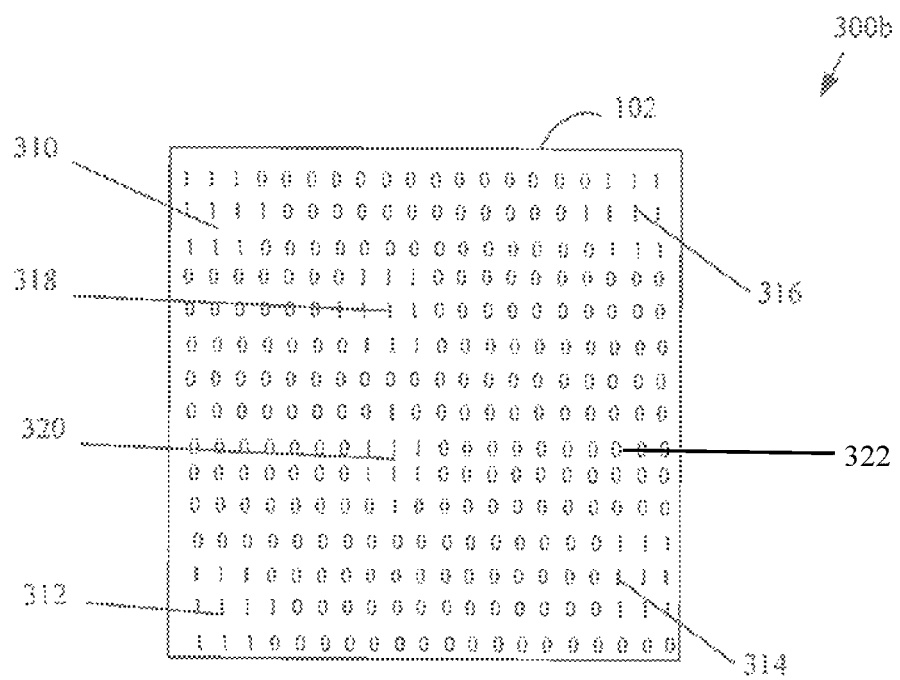
Figure 3C:
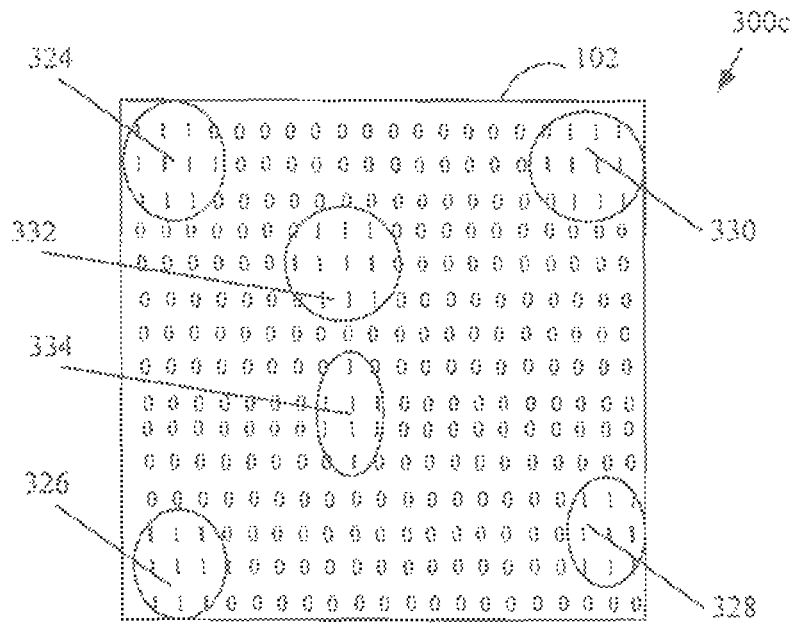
Figure 3D:
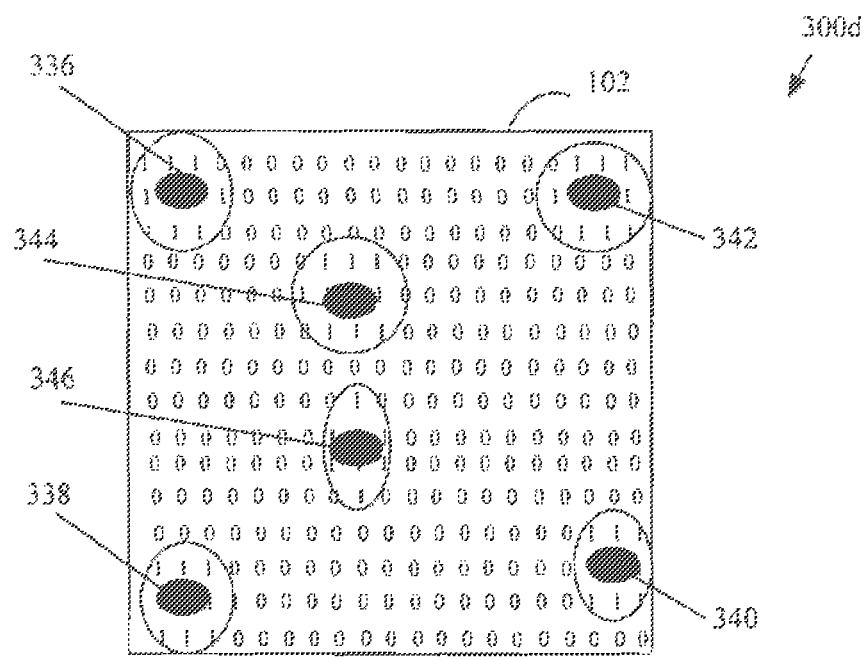

FIG. 2 is a block diagram of exemplary system for localizing a plurality of wireless transmitters, in accordance with some embodiments of the present disclosure. FIG. 2 is explained in conjunction with elements from FIG. 1. With reference to FIG. 2, there is shown the localization device 108. The localization device 108 may include a processing engine 202, a memory 204, a signal strength retrieval module 206, a clustering module 208, a database 210, a localization module 212, and/or a transceiver 214. The processing engine 202 may be communicatively coupled to the memory 204, the signal strength retrieval module 206, the clustering module 208, the database 210, the localization module 212, and/or the transceiver 214. In an embodiment, the localization device 108 may be communicatively coupled to the one or more sensors 106, through the communication network 108, via the transceiver 214.

In an embodiment, the processing engine 202 may include a binary image generation module 216 and/or a contour determination module 218. Further, the database 210 may include a signal strength table 220 and/or a transmitter position table 222. As discussed in FIG. 1, the database 210 may be integrated within the localization device 108, or may be an entity remote to the localization module 108, communicatively coupled to the localization device 108, via the communication network 110.

A person of ordinary skill in the art will appreciate that in an embodiment, the modules shown in FIG. 2 may comprise one or more set of instructions, and the modules in themselves may be stored in the memory 204. Each of the set of instructions of the stored modules may be executed by the processing engine 202, based on the various events explained in the subsequent disclosure.

In operation, the Received Signal Strength (RSSI) values corresponding one or more transmitters from the plurality of wireless transmitters 104a to 104f, may be stored in the signal strength table 220 of the database 210. Upon generation of request for localizing the plurality of wireless transmitters 104a to 104f, the processing engine 202 may be configured to instruct the signal strength retrieval module 206 to retrieve the stored RSSI values from the signal strength table 220. The processing engine 202 may include suitable logic, circuitry, interfaces, and/or code that may be configured to execute a set of instructions stored in the memory 204. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

In an embodiment, the retrieved RSSI values may correspond to a location (Cartesian coordinates with respect to the indoor space 102) of a sensor of the one or more sensors 106. The signal strength retrieval module 206 may be configured to organize the retrieved values in a data structure, such as a Signal-Strength-Matrix. Within the Signal-Strength-Matrix, each element may correspond to coordinates of a sensor of the one or more sensors 106. For example, in an instance when the indoor space includes nine sensors with Cartesian coordinates "$\{(x, y); x=0 \text{ to } 2; y=0 \text{ to } 2\}$" with measured signal strengths of "S1, S2 . . . S9" respectively, then the Signal-Strength-Matrix would be denoted by the matrix (1):

$$\begin{matrix} S7 & S8 & S9 \\ S4 & S5 & S6 \\ S1 & S2 & S3 \end{matrix} \quad (1)$$

In an embodiment, the signal strength retrieval module 206 may be configured to communicate the Signal-Strength-Matrix to the clustering module 208. The clustering module 208 may be configured to generate a plurality of clusters using the received Signal-Strength-Matrix. The clusters in the plurality of clusters "K" are mutually exclusive sets into which the signal strength values are partitioned.

In order to generate the plurality of clusters, the clustering module 208 may be configured to determine the number of clusters that need to be generated. In an embodiment, the number of the plurality of clusters may be based on may be based on a maximum range of transmission of the plurality of wireless transmitters 104a to 104f and a recommended minimum distance between the one or more sensors located in the region. A person of ordinary skill in the art will appreciate that a difference in the maximum range of transmission of the plurality of wireless transmitters 104a to 104f is less than a predefined threshold. The predefined threshold may be stored in the memory 204.

In an embodiment, the clustering module may be configured to query the signal strength table 220 to retrieve the one or more parameters relating to a maximum range of transmission of the plurality of wireless transmitters 104a to 104f and a recommended minimum distance between the one or more sensors located in the indoor space 102. The clustering module 208 may be further configured to determine the number of clusters to be generated (denoted by "K"), based on the equation (2):

$$K = \max\left(\text{CONSTANT}, \frac{\text{Maximum Range of Transmitters}}{\text{Minimum Separation between Sensors}}\right) \quad (2)$$

where, "CONSTANT" denotes an experimentally determined value of the minimum number of clusters required for performing the localization of the plurality of wireless transmitters 104a to 104f. In an embodiment, the "CONSTANT" may be stored in the memory 204 and may be configured by a user.

In accordance with the equation (2), when the maximum range of a wireless transmitter of the plurality of wireless transmitters is "25 meters", and the minimum separation between the one or more sensors 106 is "5 meters", the determined number of clusters "K" is "5".

Subsequent to determination of the number of clusters, the clustering module 208 may be configured to generate the plurality of clusters. The determination of the plurality of clusters may be based on K-means clustering algorithm. The generation may include determination of a plurality of centroids of the Signal-Strength-Matrix. In an embodiment, the plurality of centroids may be determined based on a random selection of the RSSI values from the data structure. In an embodiment, a centroid of the plurality of centroids corresponds to a signal strength value, the distance of which from every other value in the cluster is minimum. Further, the distance signifies a measure of the difference between two signal strength values. In an embodiment, the determination of the distance may be based on, but is not limited to, a Euclidean distance, a Square Euclidean distance, a Manhattan distance, or a Hamming distance. Further, for each value "x" in the Signal-Strength-Matrix, the clustering module may be configured to compute a value "D(x)", based on the distance between "x" and the nearest centroid (denoted by a value "centroid") that has already been chosen using the equation (3):

$$D(x) = |x - \text{centroid}|^2 \quad (3)$$

The clustering module 208 may be further configured to select a new centroid from the remaining values in the Signal-Strength-Matrix, where a point "x" is chosen with probability proportional to "D(x)2", by computing a ration denoted in the equation (4) for each value "x" in the Signal-Strength-Matrix:

$$\text{Ratio} = \frac{D(x)^2}{\sum_{\text{All } y \neq x} D(y)^2} \quad (4)$$

Based on the equation (4), the clustering module 208 may further select a value "x" for which the ratio is largest as the new centroid. The clustering module 208 may be further configured to repeat the aforementioned steps until "K" centroids have been determined as the plurality of centroids. Further, the clustering module 208 may be configured to calculate the distance to all the determined "K" centroids (centroid 1, centroid 2, . . . centroid K), for every value "x" in the Signal-Strength-Matrix, in accordance with equation (5):

$$\text{Distance}, D_i(x) = |x - \text{centroid } i|2 \quad (5)$$

The clustering module 208 may be further configured to assign every value in the Signal-Strength-Matrix to one of K clusters, such that a value belongs to a cluster "i" (i=1 to K), if the value's distance from centroid "i" is the least. The clustering module 208 may be further configured to recalculate the centroids of all "K" clusters to get "K" new centroids. The clustering module 208 may be configured to perform the aforementioned operations until there is no significant change in the following metric denoted by equation (6):

$$J = \sum_{i=1}^{K} \sum_{\text{All } x \text{ in cluster } i} |x - \text{centroid } i|^2 \quad (6)$$

where, "x" is a value from the Signal-Strength-Matrix and "centroid i" is the centroid of cluster "i". The clustering module 208 may be configured to communicate the generated clusters to the processing engine 202. Notwithstanding, the disclosure may not be so limited, and the generation of the plurality of clusters may be based on one or more other clustering algorithms known in the art, without limiting the scope of the disclosure.

In an embodiment, the processing engine 202 may be configured to instruct the binary image generation module 216 to generate a binary image based on the generated clusters. The binary image generation module 216 may be configured to consider a largest cluster from the generated clusters and modify the Signal-Strength-Matrix. The modification may include setting a value in the Signal-Strength-Matrix to "0" corresponding to each value in the largest cluster. Further, the remaining values are set to "1". In an embodiment, the portion of the Signal-Strength-Matrix having values "0" may correspond to a black region (or white image having black pixels), and the portion of the Signal-Strength-Matrix having values "1" may correspond to a white region (or white image having white pixels). The binary image generation module 216 may be configured to communicate the Signal-Strength-Matrix having the white regions and the black regions to the contour determination module 218.

In an embodiment, the contour determination module 218 may be configured to search each row of the Signal-Strength-Matrix for white pixels, denoted by "w1". The contour determination module 218 may initialize a set, denoted by "boundary-set" with "null" values. The contour determination module 218 may insert position of the white pixel "w1" into the "boundary-set". Further, a variable "current-boundary-pixel" may be set to the white pixel "w1". The contour determination module 218 may further set the variable "current-pixel" to a next clockwise pixel in the neighborhood of the "current-boundary-pixel". A person of ordinary skill in the art will appreciate that the definition of neighborhood of a pixel includes a set of eight pixels surrounding the pixel.

As a part of determination of the contours of the white region and the black regions, the contour determination module 218 may be configured to determine whether a current pixel corresponds to a pixel "w1". In scenarios when the a current pixel is not a pixel "w1", the contour determination module 218 may be configured to perform the following steps:

If a current-pixel is a white pixel:
Insert position of current-pixel into the "boundary-set"
Set, current-boundary-pixel=current-pixel
Set, current-pixel=next clockwise pixel in the neighborhood of current-boundary-pixel
Else, set current-pixel=next clockwise pixel in the neighborhood of current-boundary-pixel The contour determination module 218 may be configured to perform the aforementioned steps for pixels that may not be within any of the boundary sets. Further, the contour determination module 218 may be configured to communicate the determined boundary sets to the localization module 208. Such a communication of the determined boundary sets is equivalent to communicating the boundaries of the white region (white images) in the Signal-Strength-Matrix.

In order to localize the plurality of wireless transmitters 104a to 104f, the localization module 208 may be configured to query the signal strength table 220 of the database 210 for the parameter minimum separation between sensors. The localization module 208 may further calculate the coordinates "(x, y)" of the plurality of wireless transmitters in the indoor space 102 by processing each boundary point "Bi" of the received boundary sets, in accordance with the equations (7) and (8):

$$x = \frac{(\text{Minimum Separation Between Sensors}) \sum_{i=1}^{Size\ of\ Bi} x_i}{Size\ of\ Bi} \quad (7)$$

$$y = \frac{(\text{Minimum Separation Between Sensors}) \sum_{i=1}^{Size\ of\ Bi} y_i}{Size\ of\ Bi} \quad (8)$$

The localization module 212 may be further configured to store the determined coordinates of the plurality of wireless transmitters 104a to 104f in the transmitter position table 222 of the database 210. In an embodiment, such positions may be retrieved by a user external to the localization device 108, via the transceiver 214.

FIGS. 3A-3D depict the outcome of processing the retrieved RSSI values corresponding to the plurality of wireless transmitters 104a to 104f, measured by the one or more sensors 106, by the localization device 108. The elements of FIGS. 3A-D have been explained in conjunction with the elements of FIGS. 1 and 2.

With reference to FIGS. 3A-D, there are shown exemplary versions 300a, 300b, 300c, and 300d of the indoor space 102, for localizing a plurality of wireless transmitters. The exemplary version 300a depicts the outcome from the clustering module 208. The exemplary version 300a includes the plurality of clusters that are generated based on the processing performed and explained in FIG. 2, by the clustering module 208 using K-means (or in some embodiments, K-means++ algorithm). In an exemplary. The clusters in the exemplary version 300a are depicted by the clusters 302, 304, 306, and 308.

The exemplary version 300b depicts the outcome from the binary image generation module 216. The exemplary version 300b depicts indoor space being divided into white regions 310 to 320 (or white image including white pixels) and the black region 322 (or black image including black pixels). It can be seen from the image that the white regions 310 to 320 correspond to the location of the plurality of wireless transmitters, and the proximity thereof.

The exemplary version 300c depicts the outcome from the contour determination module 218. From the figure it can be seen that the outcome includes determined contours 324 to 334 of the white regions 310 to 320. In an exemplary scenario, the determination of the contours may be based on Moore-Neighbor Tracing algorithm, as explained in detail in FIGS. 1 and 2.

The exemplary version 300d depicts the outcome from the localization module 212. From the figure it can be seen that the positions (Cartesian coordinates) of the plurality of wireless transmitters 104a to 104f have been determined in the form of coordinates of the highlighted regions 336 to 346. The localized coordinates may be stored by the localization module 212 in the transmitter position table 222, as explained in FIG. 2.

Figure 4:
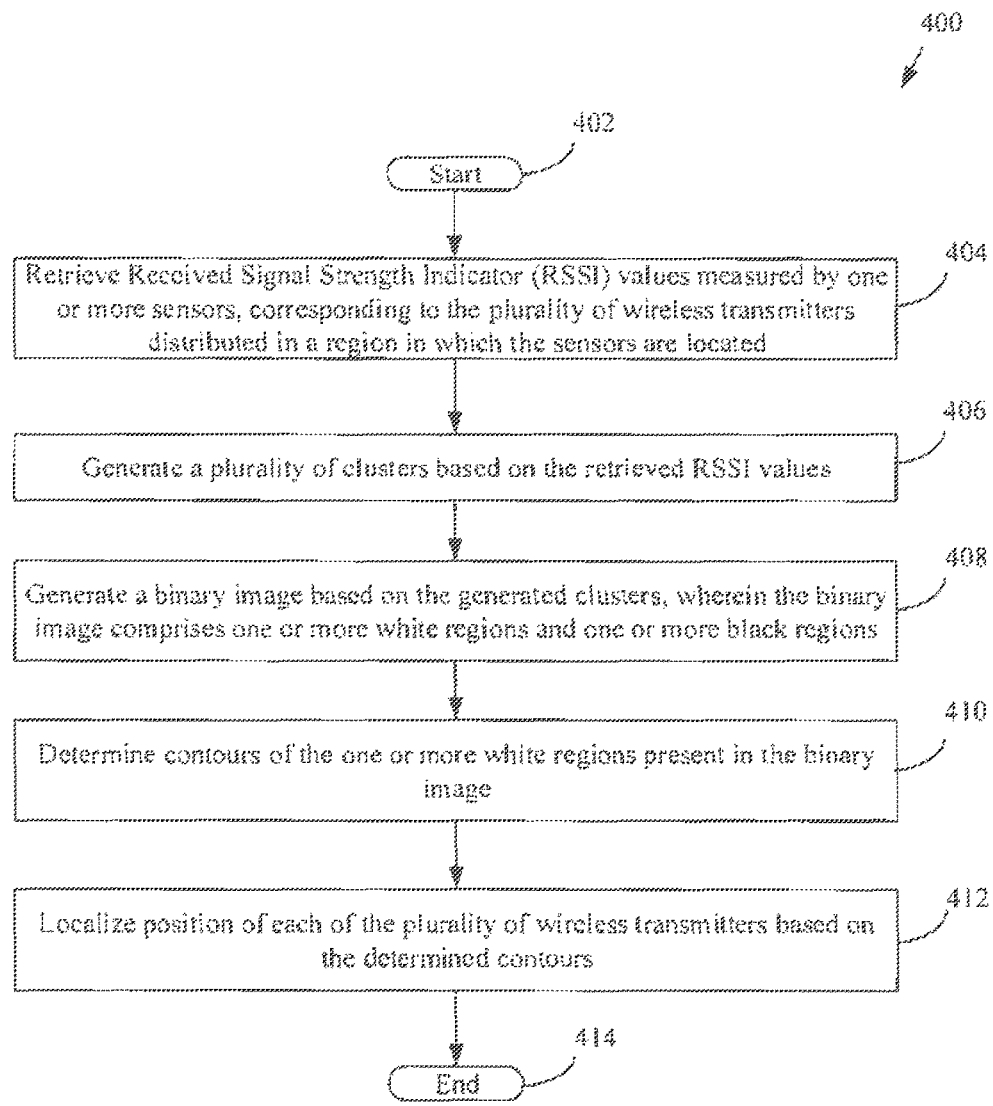
FIG. 4 is a flow diagram of a detailed exemplary process for localizing a plurality of wireless transmitters, in accordance with some embodiments of the present disclosure.

FIG. 4 is a flow diagram of a detailed exemplary process for localizing a plurality of wireless transmitters, in accordance with some embodiments of the present disclosure. With reference to FIG. 4, there is shown a flow chart 400. The flow chart 400 is described in conjunction with FIGS. 1, 2, and 3A-3D. The process starts at step 402 and proceeds to step 404.

A step 404, Received Signal Strength Indicator (RSSI) values measured by one or more sensors 106, corresponding to the plurality of wireless transmitters 104a to 104f distributed in the indoor space 102, may be retrieved by the signal strength module 206. At step 406, a plurality of clusters 302, 304, 306, and 308 may be generated based on the retrieved RSSI values, by the clustering module 208. The generation of the plurality of clusters 302, 304, 306, and 308 may be further based on a maximum range of transmission of the plurality of wireless transmitters and a recommended minimum distance between the one or more sensors located in the region.

At step 408, a binary image including white regions 310 to 320 and black region 322 may be generated by the binary image generation module 216. The generation of the aforementioned image may be based on the generated plurality of clusters 302, 304, 306, and 308. At step 410, the contours 324 to 334 may be determined by the contour determination module 218. The determination of the contours may be based on the Moore-Neighbor Tracing algorithm implemented on the generated binary image. At step 412, the positions (Cartesian coordinates) 336 to 346 of the plurality of wireless transmitters 104a to 104f may be localized by the localization module 212. The control passes to end step 414.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the technology. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the technology. When implemented on a general-purpose microprocessor, the computer program code segments configure the microprocessor to create specific logic circuits.

Figure 5:
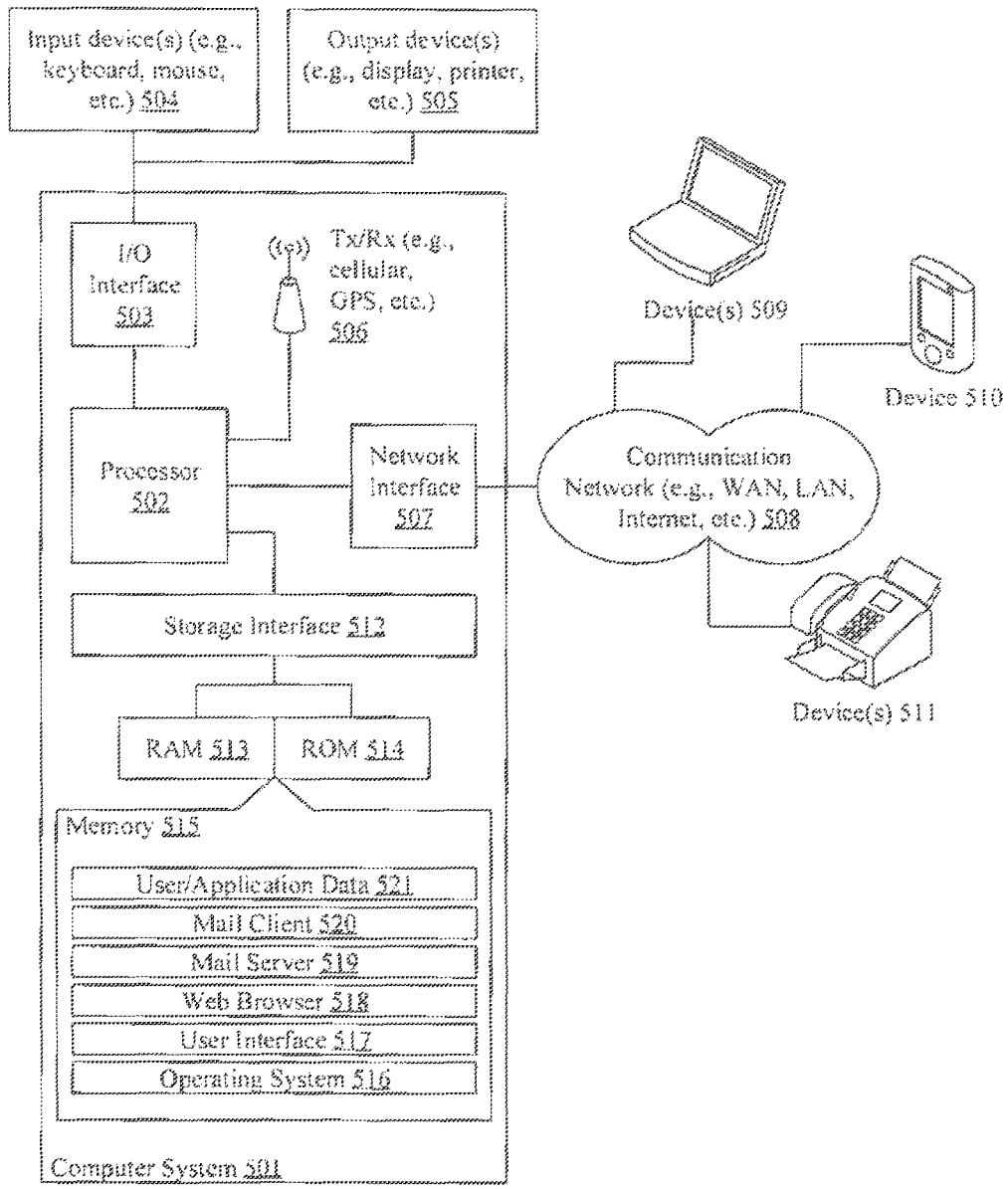
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing network environment 100 for transmitting data over a communication network. Computer system 501 may include a central processing unit ("CPU" or "processor") 502. Processor 502 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., past ticket repository, keywords, Ngrams, clusters or categories, relationship mapping, user queries, resolutions, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for localizing a plurality of wireless transmitters, thereby enabling a user to determine positions of the plurality of wireless transmitters placed in an indoor space. Based on such a determination, the user may be able to allocate the frequencies for transmission to the plurality of wireless transmitters so that no interference of frequencies takes place if and when a new transmitter is added to the indoor space. Furthermore, the present technology enables the user to optimize the bandwidth for frequency utilization. This is because when the maximum range of transmission of the plurality of wireless transmitters are known, along with the positions where the transmitters are located, the user may be able to determine a distance at the frequency used for transmission may be reused. Additionally, the present system does not rely on knowledge regarding exact power at which the plurality of wireless transmitters transmit the signals. Also, the present solution does not require a priori knowledge of the number of transmitters.

The specification has described system and method for localizing a plurality of wireless transmitters. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of localizing of wireless transmitters, the method comprising:

retrieving, by a localization device, one or more Received Signal Strength Indicator (RSSI) values measured by one or more sensors, corresponding to a plurality of wireless transmitters distributed in a region in which the one or more sensors are located;

generating, by the localization device, a plurality of clusters based on the retrieved one or more RSSI values, wherein the generation of the plurality of clusters is based on a K-means clustering algorithm;

generating, by the localization device, a binary image based on the generated plurality of clusters, wherein the binary image comprises one or more white regions and one or more black regions; and localizing, by the localization device, a position of each of the plurality of wireless transmitters, based on a determination of contours of the one or more white regions present in the binary image, wherein the one or more white regions in the binary image are indicative of a region in which one of the plurality of wireless transmitters is present.

2. The method of claim 1, wherein the generation of the plurality of clusters comprises:

creating a data structure having the one or more RSSI values measured by each of the one or more sensors, wherein each element of the data structure corresponds to a location of a sensor, from the one or more sensors, in the region; and determining a plurality of centroids of the data structure having the one or more RSSI values, based on a random selection of the one or more RSSI values from the data structure, wherein each centroid in the plurality of centroids corresponds to a cluster from the plurality of clusters.

3. The method of claim 1, wherein a count of clusters in the plurality of clusters is based on a maximum range of transmission of the plurality of wireless transmitters and a recommended minimum distance between the one or more sensors located in the region; and wherein a difference in the maximum range of transmission of the plurality of wireless transmitters is less than a predefined threshold.

4. The method of claim 1, wherein the determination of the contours of the one or more white regions is based on Moore-Neighbour Tracing algorithm.

5. The method of claim 1, wherein the position of each of the plurality of wireless transmitters are stored in a transmitter table database.

6. A localization device, comprising at least one processor and a memory having stored thereon instructions that, when executed by the at least one processor, cause the at least one processor to perform steps comprising:
   retrieving one or more Received Signal Strength Indicator (RSSI) values measured by one or more sensors, corresponding to a plurality of wireless transmitters distributed in a region in which the one or more sensors are located;
   generating a plurality of clusters based on the retrieved one or more RSSI values, wherein the generation of the plurality of clusters is based on a K-means clustering algorithm;
   generating a binary image based on the generated plurality of clusters, wherein the binary image comprises one or more white regions and one or more black regions; and
   localizing a position of each of the plurality of wireless transmitters, based on a determination of contours of the one or more white regions present in the binary image, wherein the one or more white regions in the binary image are indicative of a region in which one of the plurality of wireless transmitters is present.

7. The localization device of claim 6, wherein the generation of the plurality of clusters comprises:
   creating a data structure having the one or more RSSI values measured by each of the one or more sensors, wherein each element of the data structure corresponds to a location of a sensor, from the one or more sensors, in the region; and
   determining a plurality of centroids of the data structure having the one or more RSSI values, based on a random selection of the one or more RSSI values from the data structure, wherein each centroid in the plurality of centroids corresponds to a cluster from the plurality of clusters.

8. The localization device of claim 6, wherein a count of clusters in the plurality of clusters is based on a maximum range of transmission of the plurality of wireless transmitters and a recommended minimum distance between the one or more sensors located in the region; and
   wherein a difference in the maximum range of transmission of the plurality of wireless transmitters is less than a predefined threshold.

9. The localization device of claim 6, wherein the determination of the contours of the one or more white regions is based on Moore-Neighbour Tracing algorithm.

10. The localization device of claim 6, wherein the position of each of the plurality of wireless transmitters are stored in a transmitter table database.

11. A non-transitory computer-readable medium storing instructions for localizing of wireless transmitters, wherein upon execution of the instructions by one or more processors, the processors perform operations comprising:
   retrieving one or more Received Signal Strength Indicator (RSSI) values measured by one or more sensors, corresponding to a plurality of wireless transmitters distributed in a region in which the one or more sensors are located;
   generating a plurality of clusters based on the retrieved one or more RSSI values, wherein the generation of the plurality of clusters is based on a K-means clustering algorithm;
   generating a binary image based on the generated plurality of clusters, wherein the binary image comprises one or more white regions and one or more black regions; and
   localizing a position of each of the plurality of wireless transmitters, based on a determination of contours of the one or more white regions present in the binary image, wherein the one or more white regions in the binary image are indicative of a region in which one of the plurality of wireless transmitters is present.

12. The non-transitory computer-readable medium of claim 11, wherein the generation of the plurality of clusters comprises:
   creating a data structure having the one or more RSSI values measured by each of the one or more sensors, wherein each element of the data structure corresponds to a location of a sensor, from the one or more sensors, in the region; and
   determining a plurality of centroids of the data structure having the one or more RSSI values, based on a random selection of the one or more RSSI values from the data structure, wherein each centroid in the plurality of centroids corresponds to a cluster from the plurality of clusters.

13. The non-transitory computer-readable medium of claim 11, wherein a count of clusters in the plurality of clusters is based on a maximum range of transmission of the plurality of wireless transmitters and a recommended minimum distance between the one or more sensors located in the region; and
   wherein a difference in the maximum range of transmission of the plurality of wireless transmitters is less than a predefined threshold.

14. The non-transitory computer-readable medium of claim 11, wherein the determination of the contours of the one or more white regions is based on Moore-Neighbour Tracing algorithm.

15. The non-transitory computer-readable medium of claim 11, wherein the position of each of the plurality of wireless transmitters are stored in a transmitter table database.

* * * * *